(12) United States Patent
Nojima

(10) Patent No.: US 6,710,247 B2
(45) Date of Patent: Mar. 23, 2004

(54) JOINING STRUCTURE FOR ELECTRICAL CONNECTION BOX

(75) Inventor: Shigeru Nojima, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 10/465,621

(22) Filed: Jun. 20, 2003

(65) Prior Publication Data
US 2004/0000418 A1 Jan. 1, 2004

(51) Int. Cl.[7] ................................................. H01R 4/00
(52) U.S. Cl. ..................... 174/58; 174/63; 174/53; 220/3.9; 220/3.92; 439/535
(58) Field of Search .................... 174/58, 48, 65 R, 174/60, 64, 53, 63; 220/3.8, 3.92, 3.3, 4.02, 3.9; 248/906; 439/535

(56) References Cited

U.S. PATENT DOCUMENTS

| | | | |
|---|---|---|---|
| 4,612,412 A | * | 9/1986 | Johnston .................... 174/65 R |
| 4,844,275 A | * | 7/1989 | Schnell et al. ................ 220/3.9 |
| 5,594,207 A | * | 1/1997 | Fabian et al. .................. 174/58 |
| 5,674,090 A | | 10/1997 | Sumida et al. |
| 5,933,563 A | * | 8/1999 | Schaffer et al. ............. 385/135 |
| 6,395,979 B1 | * | 5/2002 | English ........................ 174/50 |

* cited by examiner

Primary Examiner—Dhiru R Patel
(74) Attorney, Agent, or Firm—Greenblum & Bernstein, P.L.C.

(57) ABSTRACT

A lock element provided on an exterior surface of a relay box engages with an engagement portion provided on an exterior surface of a junction box. A wire guide channel is provided on the junction box at a position adjacent to the relay box. A guide portion is provided on the relay box adjacent the lock element at a position corresponding to the wire guide channel, and a guide rail to be fitted into the guide portion is provided on the junction box. A wire is connected to the junction box and arranged along the wire guide channel. The guide portion of the relay box serves as a guide wall to control the direction of the wire in the wire guide channel. Breaking of the lock portions is prevented, and the direction of wire is controlled regardless of the diameter thereof.

16 Claims, 5 Drawing Sheets

JOINING STRUCTURE FOR ELECTRICAL CONNECTION BOX

BACKGROUND OF THE INVENTION

1. Field of the Invention

The present invention relates to a structure for joining electrical connection boxes. In particular, the invention relates to a joining structure between two electrical connection boxes installed in a vehicle.

2. Description of the Related Art

Electrical connection boxes installed in a vehicle may be joined together by locking structures provided thereon. For example, a relay box and a junction box provided with conventional joining structures are shown in FIGS. 3A–5B.

Figure 3A:
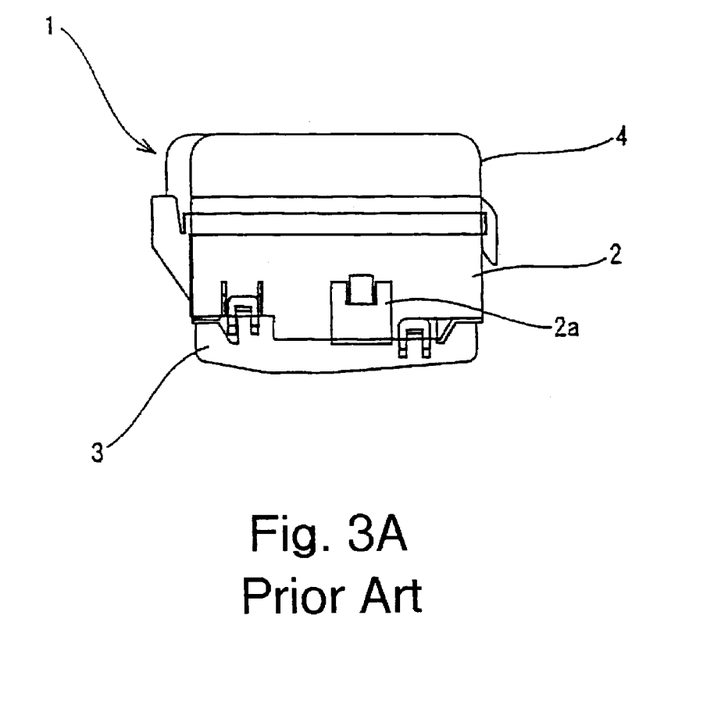
FIG. 3A is a side view of a conventional relay box.
Figure 3B:
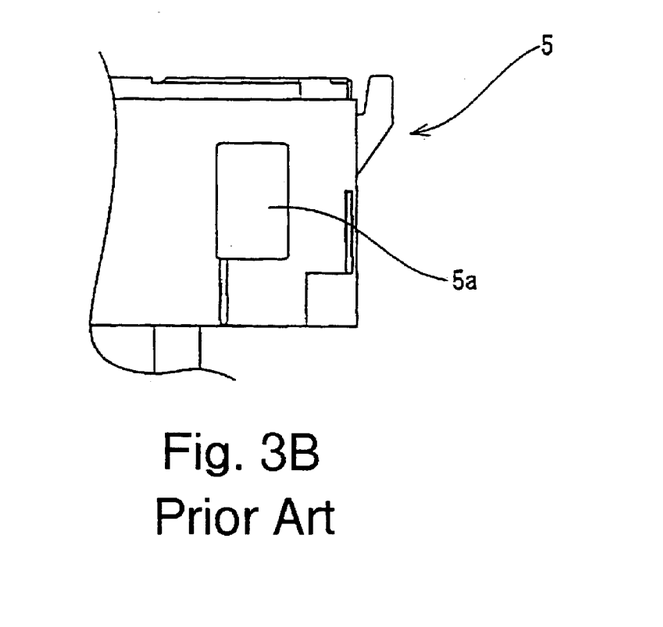
FIG. 3B is a side view of a conventional junction box.
Figure 4A:
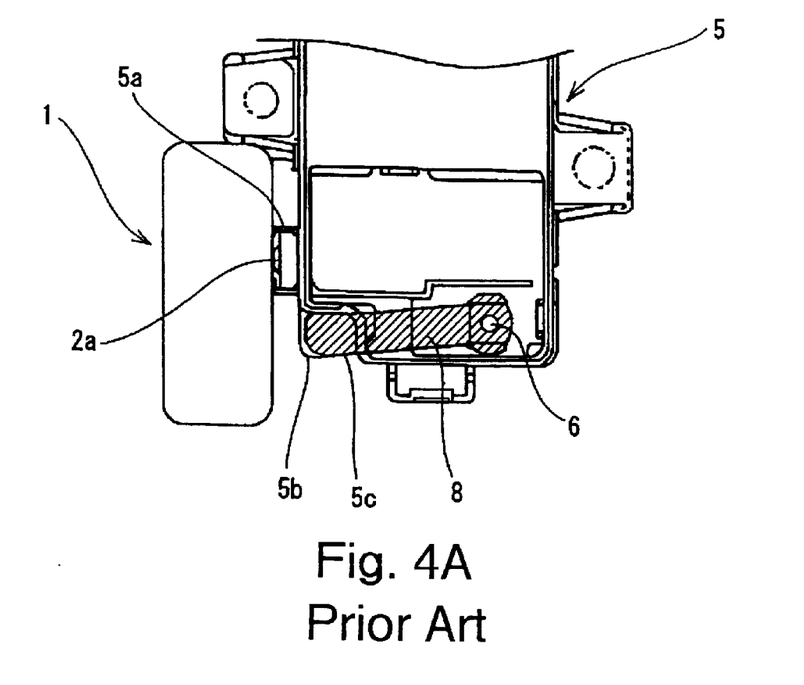
FIG. 4A is a plan view showing the conventional relay box of FIG. 3A fixed to the conventional junction box of FIG. 3B.
Figure 4B:
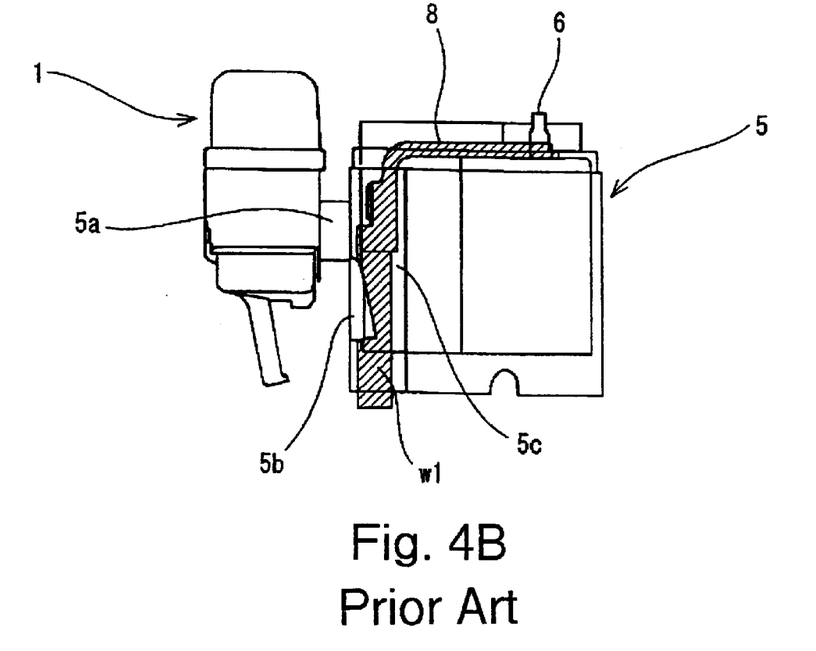
FIG. 4B is a side view showing the conventional relay box of FIG. 3A fixed to the conventional junction box of FIG. 3B.

As shown in FIG. 3A, an upper cover 4 and a lower cover 3 respectively cover upper and lower portions of a body 2 of a relay box 1. A lock element 2a is provided on an exterior surface of the body 2. As shown in FIG. 3B, an engagement portion 5a is provided on an exterior surface of a junction box 5 at a position corresponding to the lock element 2a. As shown in FIGS. 4A and 4B, the relay box 1 is fixed on the exterior surface of the junction box 5 by engaging the lock element 2a with the engagement portion 5a.

The junction box 5 is provided with a post-shaped terminal 6 on an upper surface thereof and with a wire guide channel 5c on a side surface thereof. A wire retaining element 5b projects from an intermediate portion of the wire guide 5c channel. A terminal 8 clamped to a terminal end of a wire w1 is connected to the post-shaped terminal 6. The wire w1 has a relatively large cross sectional area, such as 30 square millimeters. The wire w1 is arranged along the wire guide channel 5c and maintained therein by the wire retaining element 5b.

However, when a relatively heavy relay box 1 is fixed on a junction box 5 by the lock element 2a and the engagement portion 5a, these locking portions are subjected to an excessive load which can lead to structural failure thereof. These locking portions can also be broken by an excessive load when a lock element 2a which is not properly aligned is slidingly inserted into an engagement portion 5a by force.

Figure 5A:
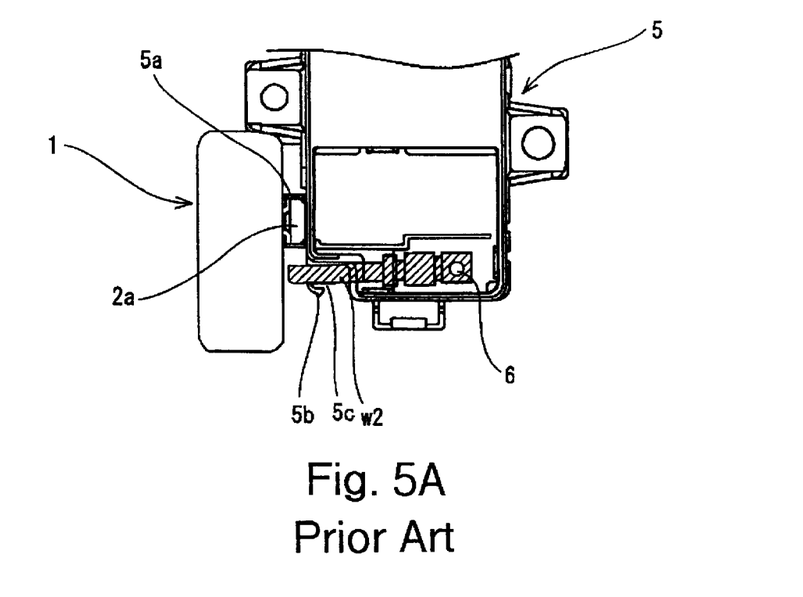
FIG. 5A is a plan view similar to FIG. 4A, in which provision of a smaller diameter or cross sectional area wire is depicted.
Figure 5B:
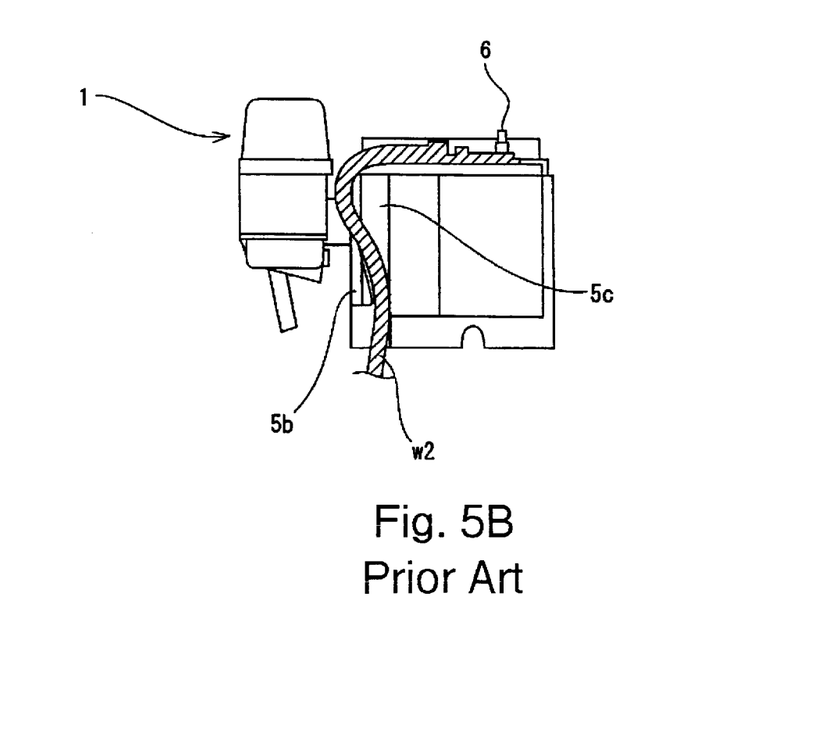
FIG. 5B is a side view similar to FIG. 4B, in which provision of a smaller meter or cross sectional area wire is depicted.

Another problem can occur when a wire w2 having a relatively small cross sectional area, such as 15 square millimeters, is connected to the post-shaped terminal 6 of the junction box 5. The space in the wire guide channel 5c is configured to receive a larger cross sectional area wire w1 therein, and the wire retaining element 5b is configured to maintain such a larger cross sectional area wire w1. Accordingly, when a smaller cross sectional area wire w2 is provided, as shown in FIGS. 5A and 5B, the direction of the smaller wire w2 cannot be controlled, and it is not maintained in the wire guide channel 5c.

SUMMARY OF THE INVENTION

The present invention has been made in view of the above-described problems. Accordingly, it is an object of the present invention to provide a structure for joining electrical connection boxes, which structure prevents material failure of locking portions and maintains the directions of wires having different diameters or cross sectional areas.

According to one aspect of the present invention, there is provided a structure for joining electrical connection boxes. The structure includes a lock element provided on a first electrical connection box and an engagement portion provided on a second electrical connection box. The lock element and the engagement portion are configured for locking engagement therebetween. The structure also includes at least one guide portion provided on the first electrical connection box adjacent to the lock element, and at least one guide rail provided on the second electrical connection box adjacent to the engagement portion. The at least one guide portion and the at least one guide rail are configured such that the at least one guide rail is slidingly received within the at least one guide portion. Further, the second electrical connection box includes a wire guide channel provided adjacent to the at least one guide rail, and the at least one guide portion functions as a guide wall for maintaining a wire within the wire guide channel by controlling a direction of the wire.

According to a further aspect of the present invention, the at least one guide portion includes a first guide portion and a second guide portion respectively provided on opposite sides of the lock element, and the at least one guide rail includes a first guide rail and a second guide rail respectively provided on opposite sides of the engagement portion. The first guide rail is slidingly received within the first guide portion, and the second guide rail is slidingly received within the second guide portion.

According to a further aspect of the present invention, the wire guide channel is provided adjacent to the first guide rail, and the first guide portion functions as a guide wall for maintaining the wire within the wire guide channel by controlling a direction of the wire.

According to a further aspect of the present invention, during joining of the first electrical connection box and the second electrical connection box, the first guide portion engages the first guide rail and the second guide portion engages the second guide rail prior to the lock element engaging the engagement portion.

According to a further aspect of the present invention, during joining of the first electrical connection box and the second electrical connection box, the first guide portion engages the first guide rail prior to the second guide portion engaging the second guide rail.

According to a further aspect of the present invention, a leading portion is provided on the first electrical connection box for aligning the at least one guide portion with the at least one guide rail during joining of the first electrical connection box and the second electrical connection box.

According to a further aspect of the present invention, a wire retaining element is provided on the second electrical connection box, the wire retaining element extending partially around the wire guide channel for maintaining a wire within the wire guide channel.

According to a further aspect of the present invention, the at least one guide portion and the wire retaining element engage different portions of a wire within the wire guide channel.

According to another aspect of the present invention, there is provided a structure for joining electrical connection boxes. The structure includes a lock element provided on a first electrical connection box and an engagement portion provided on a second electrical connection box. The lock element and the engagement portion are configured for locking engagement therebetween. The structure also includes at least one guide portion provided on the first electrical connection box adjacent to the lock element, and at least one guide rail provided on the second electrical connection box adjacent to the engagement portion. The at least one guide portion and the at least one guide rail are configured such that the at least one guide rail is slidingly received within the at least one guide portion.

According to a further aspect of the present invention, the at least one guide portion includes a first guide portion and a second guide portion respectively provided on opposite sides of the lock element, and the at least one guide rail includes a first guide rail and a second guide rail respectively provided on opposite sides of the engagement portion. The first guide rail is slidingly received within the first guide portion, and the second guide rail is slidingly received within the second guide portion.

According to a further aspect of the present invention, the second electrical connection box includes a wire guide channel provided adjacent to the first guide rail, and the first guide portion functions as a guide wall for maintaining a wire within the wire guide channel by controlling a direction of the wire.

According to a further aspect of the present invention, a wire retaining element is provided on the second electrical connection box, the wire retaining element extending partially around the wire guide channel for maintaining a wire within the wire guide channel.

According to a further aspect of the present invention, the first guide portion and the wire retaining element engage different portions of a wire within the wire guide channel.

According to a further aspect of the present invention, during joining of the first electrical connection box and the second electrical connection box, the first guide portion engages the first guide rail and the second guide portion engages the second guide rail prior to the lock element engaging the engagement portion.

According to a further aspect of the present invention, during joining of the first electrical connection box and the second electrical connection box, the first guide portion engages the first guide rail prior to the second guide portion engaging the second guide rail.

According to a further aspect of the present invention, a leading portion is provided on the first electrical connection box for aligning the at least one guide portion with the at least one guide rail during joining of the first electrical connection box and the second electrical connection box.

As described above, the guide portion is provided on the first electrical connection box adjacent to the lock element, and the lock element is engaged with the engagement portion while the guide portion is slidingly fitted on the guide rail of the second electrical connection box. Accordingly, the lock element is aligned in the correct position by the guide portion and fixed with the engagement portion. The destruction of the lock element and engagement portion during engagement can be avoided. After engaging the lock element and the engagement portion, since the guide portion as well as the lock element support the weight of the first electrical connection box, the guide portion reinforces the lock element, and the load on the lock element and engagement portion can be dispersed.

Further, since the guide portion is located adjacent to the wire guide channel of the second electrical connection box, even though the diameter or cross sectional area of the wire to be arranged along the wire guide channel is much smaller than that of the wire guide channel, it is possible to control the direction of the small wire along the wire guide channel because the guide portion located opposite the wire guide channel functions as a guide wall for the wire.

As described above, when the first electrical connection box is joined to the second electrical connection box, the first electrical connection box is loosely positioned by the first guide portion fitted on the first guide rail, and then completely positioned by the second guide portion fitted on the second guide rail. Thereafter, the lock element can be engaged with the engagement portion without shifting. The destruction of the lock element and the engagement portion can be avoided.

The first electrical connection box is attached to the second electrical connection box at three points by the lock portions, the first guide portions and the second guide portions. Thus, it is possible to reinforce the lock portions by dispersing the load force.

BRIEF DESCRIPTION OF THE DRAWINGS

The above, and other objects, features and advantages of the present invention will be made apparent from the following description of the preferred embodiments, given as nonlimiting examples, with reference to the accompanying drawings in which.

DETAILED DESCRIPTION OF THE PREFERRED EMBODIMENTS

The particulars shown herein are by way of example and for purposes of illustrative discussion of the embodiment of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1A:
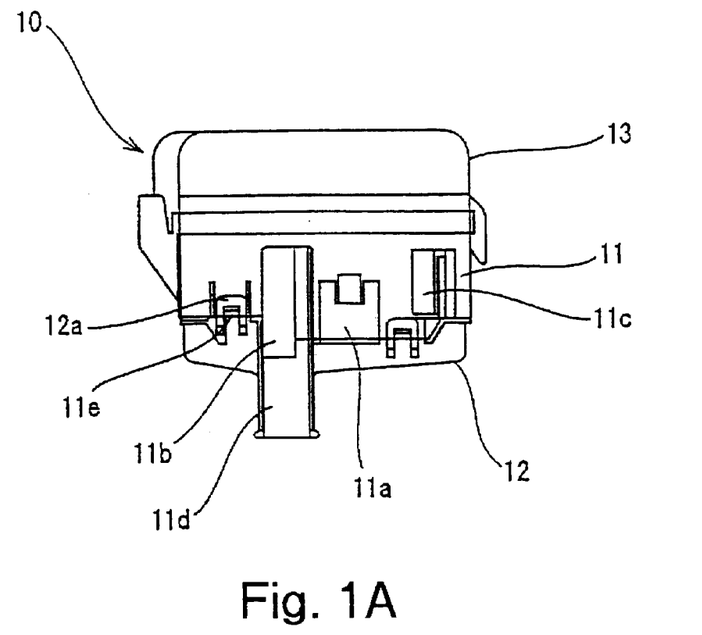
FIG. 1A is a side view showing a relay box according to an embodiment of the invention.

An embodiment of the present invention will be described below with reference to the drawings. FIG. 1A shows a first electrical connection box in the form of a relay box 10. A lock element 11a is provided on an exterior surface of a body 11 of the relay box 10. A first guide portion 11b and a second guide portion 11c are also provided on the exterior surface of the body 11. The first and second guide portions 11b, 11c are respectively provided on opposite sides of the lock element 11a. The first and second guide portions 11b, 11c may have any suitable configuration, and in the present embodiment define channels having L-shaped cross-sections.

A leading portion 11d, having a hollow sectional shape, extends downwardly from the first guide portion 11b. The leading portion 11d is configured so as to align the first guide portion 11b with a first guide rail 20b, discussed below. A lower end of the first guide portion 11b is located lower than a lower end of the second guide portion 11c.

Clamp elements 11e extend from predetermined positions on the exterior surface of the body 11. Clamp frames 12a extend from a lower cover 12 at positions corresponding to the clamp elements 11e of the body 11. When the clamp frames 12a of the lower cover 12 are engaged with the clamp elements 11e of the body 11, the lower cover 12 is fixed to and covers a lower portion of the body 11. An upper cover 13 covers an upper portion of the body 11. The upper cover 13 may be fixed to the upper portion of the body 11 by any suitable structure.

Figure 1B:
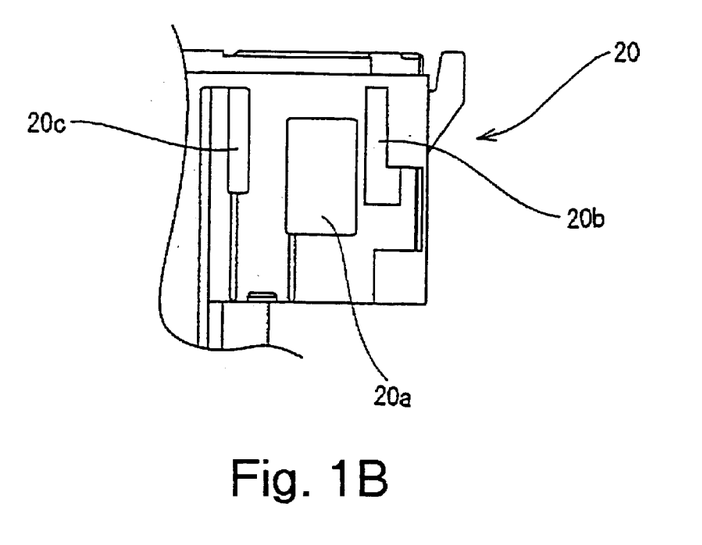
FIG. 1B is a side view showing a junction box according to an embodiment of the invention.

FIG. 1B shows a second electrical connection box in the form of a junction box 20. An engagement portion 20a is provided on an exterior surface of the junction box 20 at a position corresponding to the lock element 11a of the relay box 10. The first guide rail 20b and a second guide rail 20c are also provided on the exterior surface of the junction box 20, located on opposite sides of the engagement portion 20a. The first and second guide rails 20b, 20c are respectively provided at positions corresponding to the first and second guide portions 1b, 11c of the relay box 10. The first and second guide rails 20b, 20c cooperate with the first and second guide portions 11b, 11c, and may have any suitable configuration. In the present embodiment, the first and second guide rails 20b, 20c have L-shaped cross-sections. An upper end of the engagement portion 20a is located lower than upper ends of the first guide rail 20b and the second guide rail 20c.

Figure 2A:
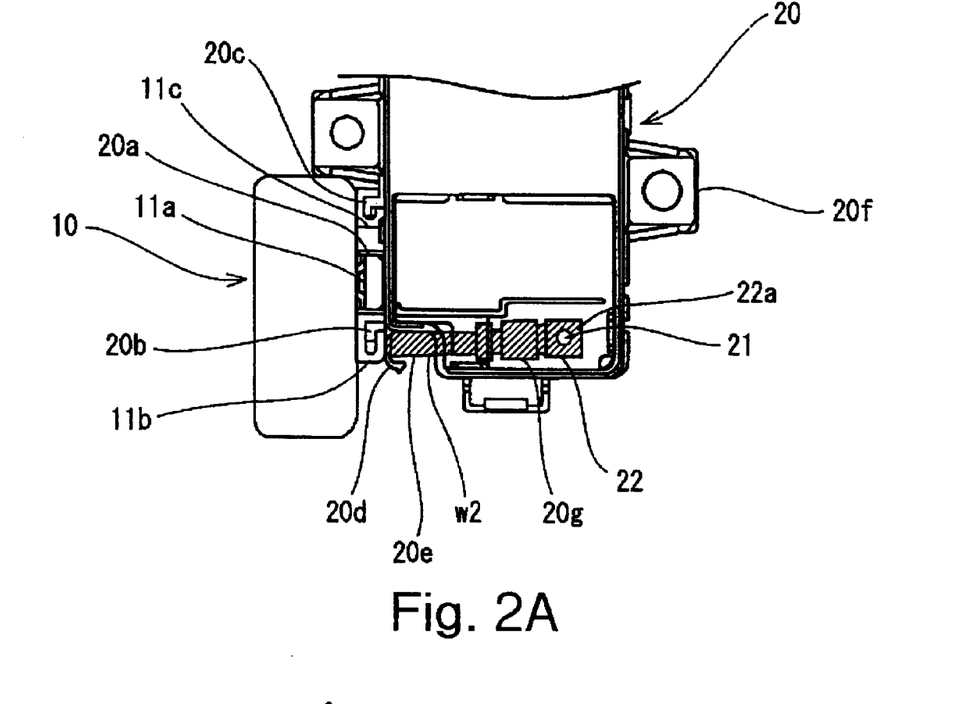
FIG. 2A is a plan view showing the relay box of FIG. 1A fixed to the junction box of FIG. 1B.
Figure 2B:
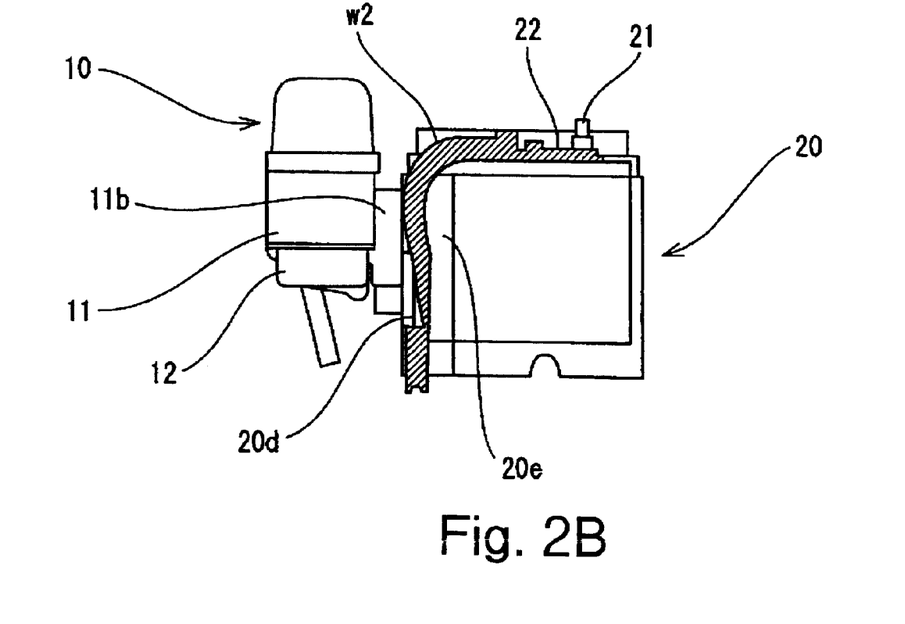
FIG. 2B is a side view showing the relay box of FIG. 1A fixed to the junction box of FIG. 1B.

As shown in FIG. 2A and 2B, the junction box 20 is provided with a post-shaped terminal 21 extending from an upper surface thereof, and with a wire guide channel 20e configured as a channel or groove at a corner thereof. A wire retaining element 20d extends from an intermediate portion of wire guide channel 20e. The wire retaining element 20d is substantially L-shaped, and partially surrounds the space defined by the wire guide channel 20e. The wire guide channel 20e defines a space large enough to contain a relatively large diameter wire, such as a wire w1 having a cross sectional area of 30 square millimeters. The wire retaining element 20d extends only partially around the space, so that the wire can be easily inserted into the wire guide channel 20e.

Brackets 20f are provided at predetermined positions of the junction box 20 for fixing the junction box 20 onto a body of a vehicle.

The relay box 10 is fixed to the junction box 20 in the following manner. A side surface of the relay box 10 is slid downward along a side surface of the junction box 20. The leading portion 11d of the relay box 10 aligns the first guide portion 11b with the first guide rail 20b of the junction box 20, and the first guide rail 20b is inserted into the first guide portion 11b. In this condition, the relay box 10 is roughly or loosely positioned against the junction box 20.

When the relay box 10 is moved further downward, the second guide rail 20c is inserted into the second guide portion 11c. In this condition, the relay box 10 is completely or firmly positioned against the junction box 20.

In the condition in which the relay box 10 is correctly positioned with the first guide portion 11b engaging the first guide rail 20b, and the second guide portion 11c engaging the second guide rail 20c, further downward movement of the relay box 10 engages the lock element 11a with the engagement portion 20a.

A wire having a relatively small diameter, such as a wire w2 having a cross sectional area of 15 square millimeters, is provided with a terminal 22 clamped to a leading end thereof. The terminal 22 has a hole 22a which is fitted around a post-shaped terminal 21 provided on the upper surface of the junction box 20. A terminal retainer 20g retains the terminal 22 along the upper surface of the junction box 20. The wire w2 extends downward along the space within the wire guide channel 20e. The wire retaining element 20d loosely retains the wire w2 in order to prevent the wire from coming out of the wire guide channel 20e.

Further, the first guide portion 11b is located adjacent to the wire guide channel 20e of the junction box 20. Accordingly, even though the wire w2 has a diameter or cross sectional area that is much smaller than the space within the wire guide channel 20e, it is possible to control the direction of the wire w2 along the wire guide channel 20e because the first guide portion 11b functions as a guide wall for the wire w2.

When the relay box 10 is fixed to the junction box 20, the relay box 10 is roughly positioned by fitting the first guide portion 11b onto the first guide rail 20b, and then completely positioned by fitting the second guide portion 11c onto the second guide rail 20c. Accordingly, the lock element 11a is aligned in the correct position and stably locked with the engagement portion 20a. The destruction of the lock element 11a or the engagement portion 20a during engagement can thereby be avoided.

After the lock element 11a engages the engagement portion 20a, the relay box 10 is attached to the junction box 20 at three positions. These positions include the engagement positions between the lock element 11a and engagement portion 20a, the first guide portion 11b and the first guide rail 20b, and the second guide portion 11c and the second guide rail 20c. Thus, the lock element 11a and the engagement portion 20a are reinforced by spreading out the load force between the three attachment positions.

According to the present invention, the guide portions are provided adjacent the lock element of the first electrical connection box. The lock element engages the engagement portion while the guide portions are fitted on the guide rails provided on the second electrical connection box. Thus, the lock element is aligned in the correct position and stably fixed to the engagement portion. The destruction of the lock element and the engagement portion due to misalignment can be avoided.

After engaging the lock portions, the guides portions as well as the lock portions support the weight of the first electrical connection box. As a result, the load on the lock portions can be dispersed, and the guide portions reinforce the lock portions. Further, the first guide portion is located adjacent to the wire guide channel of the second electrical connection box. In this manner, the direction of a small diameter or small cross sectional area wire along the wire guide channel is controlled by the first guide portion which is located opposite to the wire guide channel and functions as a guide wall for the wire.

While the embodiment has described the electrical connector boxes as a relay box and a junction box, the invention also includes joining structure for connecting any of fuse boxes, relay boxes, combined fuse and relay boxes, junction boxes, or similar components.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in priority Japanese Patent Application No. 2002-188371 filed on Jun. 27, 2002, which is herein expressly incorporated by reference in its entirety.

What is claimed:

1. A structure for joining electrical connection boxes, comprising:
   a lock element provided on a first electrical connection box;
   an engagement portion provided on a second electrical connection box, said lock element and said engagement portion being configured for locking engagement therebetween;
   at least one guide portion provided on the first electrical connection box adjacent to said lock element; and
   at least one guide rail provided on the second electrical connection box adjacent to said engagement portion, said at least one guide portion and said at least one guide rail being configured such that said at least one guide rail is slidingly received within said at least one guide portion;
   wherein the second electrical connection box includes a wire guide channel provided adjacent to said at least one guide rail, and said at least one guide portion functions as a guide wall for maintaining a wire within the wire guide channel by controlling a direction of the wire.

2. The structure for joining electrical connection boxes according to claim 1,
   said at least one guide portion comprising a first guide portion and a second guide portion respectively provided on opposite sides of said lock element; and
   said at least one guide rail comprising a first guide rail and a second guide rail respectively provided on opposite sides of said engagement portion;
   wherein said first guide rail is slidingly received within said first guide portion, and said second guide rail is slidingly received within said second guide portion.

3. The structure for joining electrical connection boxes according to claim 2,
   wherein the wire guide channel is provided adjacent to said first guide rail, and said first guide portion functions as a guide wall for maintaining the wire within the wire guide channel by controlling a direction of the wire.

4. The structure for joining electrical connection boxes according to claim 2, wherein during joining of the first electrical connection box and the second electrical connection box, said first guide portion engages said first guide rail and said second guide portion engages said second guide rail prior to said lock element engaging said engagement portion.

5. The structure for joining electrical connection boxes according to claim 4, wherein during joining of the first electrical connection box and the second electrical connection box, said first guide portion engages said first guide rail prior to said second guide portion engaging said second guide rail.

6. The structure for joining electrical connection boxes according to claim 1, further comprising a leading portion provided on the first electrical connection box for aligning said at least one guide portion with said at least one guide rail during joining of the first electrical connection box and the second electrical connection box.

7. The structure for joining electrical connection boxes according to claim 1, wherein a wire retaining element is provided on the second electrical connection box, the wire retaining element extending partially around the wire guide channel for maintaining a wire within the wire guide channel.

8. The structure for joining electrical connection boxes according to claim 7, wherein said at least one guide portion and the wire retaining element engage different portions of a wire within the wire guide channel.

9. A structure for joining electrical connection boxes, comprising:
   a lock element provided on a first electrical connection box;
   an engagement portion provided on a second electrical connection box, said lock element and said engagement portion being configured for locking engagement therebetween;
   at least one guide portion provided on the first electrical connection box adjacent to said lock element; and
   at least one guide rail provided on the second electrical connection box adjacent to said engagement portion, said at least one guide portion and said at least one guide rail being configured such that said at least one guide rail is slidingly received within said at least one guide portion.

10. The structure for joining electrical connection boxes according to claim 9,
    said at least one guide portion comprising a first guide portion and a second guide portion respectively provided on opposite sides of said lock element; and
    said at least one guide rail comprising a first guide rail and a second guide rail respectively provided on opposite sides of said engagement portion;
    wherein said first guide rail is slidingly received within said first guide portion, and said second guide rail is slidingly received within said second guide portion.

11. The structure for joining electrical connection boxes according to claim 10,
    wherein the second electrical connection box includes a wire guide channel provided adjacent to said first guide rail, and said first guide portion functions as a guide wall for maintaining a wire within the wire guide channel by controlling a direction of the wire.

12. The structure for joining electrical connection boxes according to claim 11, wherein a wire retaining element is provided on the second electrical connection box, the wire retaining element extending partially around the wire guide channel for maintaining a wire within the wire guide channel.

13. The structure for joining electrical connection boxes according to claim 12, wherein said first guide portion and the wire retaining element engage different portions of a wire within the wire guide channel.

14. The structure for joining electrical connection boxes according to claim 10, wherein during joining of the first electrical connection box and the second electrical connection box, said first guide portion engages said first guide rail and said second guide portion engages said second guide rail prior to said lock element engaging said engagement portion.

15. The structure for joining electrical connection boxes according to claim 14, wherein during joining of the first electrical connection box and the second electrical connection box, said first guide portion engages said first guide rail prior to said second guide portion engaging said second guide rail.

16. The structure for joining electrical connection boxes according to claim 9, further comprising a leading portion provided on the first electrical connection box for aligning said at least one guide portion with said at least one guide rail during joining of the first electrical connection box and the second electrical connection box.

* * * * *